(12) United States Patent
Wang et al.

(10) Patent No.: US 11,349,308 B2
(45) Date of Patent: May 31, 2022

(54) AUTOMATIC GENERATION CONTROL ENHANCEMENT FOR FAST-RAMPING RESOURCES

(71) Applicant: Midcontinent Independent System Operator, Inc., Carmel, IN (US)

(72) Inventors: Fengyu Wang, Carmel, IN (US); Yaming Ma, Carmel, IN (US); Pavan Kumar Addepalle, Carmel, IN (US); Akshay Korad, Carmel, IN (US)

(73) Assignee: Midcontinent Independent System Operator, Inc., Carmel, IN (US)

( * ) Notice: Subject to any disclaimer, the term of this patent is extended or adjusted under 35 U.S.C. 154(b) by 0 days.

(21) Appl. No.: 16/591,933

(22) Filed: Oct. 3, 2019

(65) Prior Publication Data

US 2020/0112170 A1 Apr. 9, 2020

Related U.S. Application Data

(60) Provisional application No. 62/740,593, filed on Oct. 3, 2018.

(51) Int. Cl.
*H02J 3/14* (2006.01)
*G05B 17/02* (2006.01)
*H02J 13/00* (2006.01)

(52) U.S. Cl.
CPC ............. *H02J 3/14* (2013.01); *G05B 17/02* (2013.01); *H02J 13/0006* (2013.01)

(58) Field of Classification Search
CPC .......... H02J 3/14; H02J 13/0006; H02J 3/144; G05B 17/02; Y02B 90/20; Y02B 70/3225; Y04S 20/222; Y04S 20/00
See application file for complete search history.

(56) References Cited

U.S. PATENT DOCUMENTS

| | | | |
|---|---|---|---|
| 10,574,056 B1* | 2/2020 | Wilches Bernal | H02J 3/28 |
| 2011/0178643 A1* | 7/2011 | Metcalfe | F24D 19/1006 700/276 |
| 2012/0029720 A1* | 2/2012 | Cherian | H02J 13/0086 700/297 |
| 2012/0323396 A1* | 12/2012 | Shelton | H02J 3/381 700/297 |
| 2013/0046895 A1* | 2/2013 | Metcalfe | H02J 3/46 709/226 |
| 2014/0058576 A1* | 2/2014 | Jackson | G06F 1/263 700/297 |
| 2015/0280435 A1* | 10/2015 | Metcalfe | G05B 15/02 700/295 |

(Continued)

*Primary Examiner* — Darrin D Dunn
(74) *Attorney, Agent, or Firm* — BakerHostetler

(57) ABSTRACT

A method for operating an electrical power grid system is provided. The electrical power grid system includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources. The method involves controlling dispatch of electricity on the electrical power grid including enabling fast-ramping resources.

11 Claims, 14 Drawing Sheets

(56) References Cited

U.S. PATENT DOCUMENTS

| | | | |
|---|---|---|---|
| 2015/0303697 A1* | 10/2015 | Ploett | H02J 3/46 |
| | | | 700/287 |
| 2018/0123352 A1* | 5/2018 | Hunt | H02J 7/02 |
| 2019/0173282 A1* | 6/2019 | Lelusz | H02J 13/00034 |

* cited by examiner

| Objective | Design Concern | Principles |
|---|---|---|
| Reliability | Fast signal design | 1. Maintain system reliability before meeting individual unit needs |
| | Coordinated fast-slow signal | 2. Avoid fast/slow competing against each other |
| | | 3. Keep in slow resource capability |
| Efficiency | All regulation reserve for system reliability | 4. Avoid charging fast regulation resources with slow regulation resources |
| Flexibility | Technology independent | 5. Ensure reliability while maximizing the use of a variety of technologies |

FIG. 2

AUTOMATIC GENERATION CONTROL ENHANCEMENT FOR FAST-RAMPING RESOURCES

CROSS-REFERENCE TO RELATED APPLICATIONS

The current application claims priority to U.S. Provisional Application Ser. No. 62/740,593, filed Oct. 3, 2018, the entire disclosure of which is incorporated herein by reference.

BACKGROUND

The current disclosure related generally to electric power grids, and more particularly to methods, apparatuses and systems for controlling and operating such electric power grids to enhance automatic generation control (AGC) for fast-ramping resources in such power grid systems. A fast-ramping resource is a Generation Resource that (1) meets the qualification criteria of having a: (i) Ramp Rate greater than eighty (80) MW per minute; (ii) performance score of 70 percent or better when responding to regulation signals; and (iii) duration greater than 20 minutes or more for Use Limited Resources; and (2) as such, will receive a fast changing regulation signal for a market interval for which it has been offered. An exemplary controller, according to the current disclosure, administers the market for electricity producers and users on an electric power grid. Some exemplary functions of the controller include monitoring energy transfers on the transmission system, scheduling transmission service, managing power congestion, operating DA and RT energy and operating reserves ("OR") markets, and regional transmission planning. The controller will process the offers and bids to determine commitments of electrical power and then controlling the dispatch of electricity on the grid based upon the commitments.

AGC is a mechanism for ensuring reliability by balancing power in real time. The current disclosure provides approaches for enhancing how such controllers deploy fast-ramping resource for balancing to better utilize the capability of resources while maintaining reliability. The current disclosure provides options for improving reliability, efficiency and flexibility. Reliability refers to the ability to effectively apply and have available sufficient regulating reserves to balance the system. It is measured by Balancing Authority Area Control Area (ACE) Limit (BAAL). Efficiency reflects the ability to optimize system dispatch across all product types and maximize resource usage. The targeted use of fast-ramping resources to track movement in ACE could increase the effectiveness of total system response and free up slower resources from regulating reserve to participate in energy dispatch. Flexibility addresses the ability to better utilize fast-ramping resources and better-prepare the controller for future increasing variability. With recent developments in the electricity energy industry, such as renewable resource penetration and increased use of demand response resources, there is a potential for increased variability in the system. A bulk electric power system with more fast-ramping capabilities could demonstrate more flexibility (See FIG. 14). An AGC enhancement could better utilize fast-ramping resources to support reliability and efficiency. Greater usage of fast-ramping resources could result in increased compensation which could provide incentive and attract new technologies profitable participation of the controller's market and operations.

FIG. 3 summarizes current AGC logic. This logic takes system frequency and interchange as inputs to calculating ACE and determines the regulating reserve deployment on each individual resource for every 4-second cycle. The deadband is a threshold which AGC uses to determine when to respond to ACE disturbances. Only if the ACE disturbance is greater than the deadband, does the AGC send out correction signals, or regulating reserve deployment, to generations. The deadband functions as a low-pass filter to prevent AGC response to noise in the ACE. Regulation Reduction—the desired megawatt output for each generator is typically composed of three components: the control basepoint, the contingency reserve deployment and the regulating reserve deployment. If the net movement of the unit towards their control basepoints is in the same direction as the ACE correction, there is no need to include the request for that movement in the regulating reserve deployment. The total regulating reserve deployment in the AGC cycle will be reduced by a megawatt component that represents the correction that will be realized if the participating units were to simply move to their current basepoint plus contingency reserve levels. The converging adder is part of existing AGC logic that makes sure the control ACE/frequency loop converges. It includes an algorithm to detect a potential divergence. Once divergence is detected, an extra amount of regulating reserve deployment will be applied as a convergence adder. Priority Group Regulation Logic—after the AGC logic determines the total amount of regulating reserve deployment that the system needs to correct ACE, the total deployment is allocated to each individual regulating resource based on priority groups. For each regulating resource, the controller's 5-minute unit economic dispatch (UDS) process calculates a priority group number based on the available ramp rate for regulating reserves. The available ramp rate is the offered ramp-rate subtracting the ramp-rate used by the control base point movement. Priority groups with lower numbers usually include resources with higher available ramp rates. Total regulating reserve deployment is allocated to lower numbered priority group according to UDS-cleared regulating reserve megawatts. Within the same priority group, deployment is proportionally allocated to each resource based on cleared regulating reserve megawatts.

Referring to FIG. 3, according to current AGC logic, fast-ramping resources are normally assigned to the first priority group. Resources in the first priority group, when total deployment magnitude increases, are deployed immediately. However, when the magnitude decreases, other resources will be withdrawn back to zero deployment before the first priority group. The "un-deploy last" approach limits the usage of fast-ramping resources to respond to system changes, particularly when total system requirements switch direction. Another drawback for the "un-deploy last" feature is that fast-ramping resources are deployed persistently until other resources are un-deployed. For many energy-limited resources, this logic could drain/fill energy storage resources. Empty/fully charged energy-limited resources are unable to provide further regulating reserve services. FIG. 6 illustrates example signals from existing AGC logic.

The AGC enhancements described herein are not specifically designed for energy-limited resources. However, most energy limited resources, such as energy storage batteries, have fast ramp-rate capabilities. The current disclosure includes consideration of how to support enhanced usage of these limited-duration resources while providing desired services There is a desire to enhance AGC logic to better-utilize fast-ramp resources for regulating reserves. Enhanced participation of fast-ramping resources in controller's markets could improve system performance. In particular, fast-ramping resources could increase the controller's system response rate to ACE corrections, lower frequency deviations and enhance system robustness. In turn, an increase in mileage for fast-response resources could increase total compensation, attracting further application of fast-response resources for regulating reserve.

SUMMARY

Systems and methods for operating an electrical power grid system are provided. The electrical power grid system includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources. The systems and methods involve controlling dispatch of electricity on the electrical power grid including enabling fast-ramping resources.

In an aspect the system/method performs the following steps: (a) providing a fast signal representing total deployment for fast resources and a slow signal representing total deployment for slow resources; (b) controlling the slow resources using the slow signal; and (c) controlling the fast ramping resources based upon the fast signal, wherein step (c) utilizes the fast signal to respond to changes in total regulation deployment. In a more detailed embodiment, the fast signal utilization is based upon the equation:

$$R_{fast}'(t)=[R_{total}(t)-R_{total}(t-1)]+R_{fast}(t-1)$$

Where, $R_{total}(t)$ is AGC deployed total regulating reserve for MISO at time slot t, $R_{fast}(t)$ is AGC deployed regulating reserve on fast-ramp resources at time slot t, $R_{fast}'(t)$ is the term of fast signal responding to changes of total deployment.

In another aspect the system/method performs the following steps: (a) providing a fast signal representing total deployment for fast resources and a slow signal representing total deployment for slow resources; (b) controlling the slow resources using the slow signal; and (c) controlling the fast ramping resources based upon the fast signal; where steps (b) and (c) gradually replace deployment of fast-ramping resources with slow-ramping resources. In a more detailed embodiment, the gradual replacement of fast-ramping resources with slow-ramping resources is based on the equations, $$R_{fast}'(t)=[R_{total}(t)-R_{total}(t-1)]+R_{fast}(t-1)$$

$$R_{fast}(t)=R_{fast}'(t)+\varepsilon*\{sign(R_{total}(t))*max[|-RClr_{slow}(t), 0]-R_{fast}'(t)\}$$

Where, $RClr_{slow}(t)$ is UDS cleared regulating reserve MW on slow-ramping resources at time slot t, ε is damping factor, which is a positive value and less than one.

In a further detailed embodiment, the slow signal is created by subtracting the fast signal from the total deployment.

$$R_{slow}(t)=R_{total}(t)-R_{fast}(t)$$

Where, $R_{slow}(t)$ is AGC deployed regulating reserve on slow-ramping resources at time slot t.

In another aspect the system/method controls dispatch of electricity on the electrical power grid including enabling fast-ramping resources, where the controlling step includes utilizing fast-ramping resources to respond to total Area Control Error (ACE) correction need. In a more detailed embodiment, the controlling step uses logic that derives total regulating reserve deployment, and also derives regulating reserve deployment for fast and slow resources from the derived total regulating reserve deployment.

In another aspect the system/method controls dispatch of electricity on the electrical power grid including enabling fast-ramping resources, where the controlling step uses fast-ramping resources to respond to instant changes of total deployment and then adjusts the use of the fast-ramping resources to make room for slower ramping resources as the slower ramping resources ramp up.

In another aspect the system/method controls dispatch of electricity on the electrical power grid including enabling fast-ramping resources, where the controlling step uses fast-ramping resources to respond to instant changes of total deployment and then adjusts the use of the fast-ramping resources to control energy levels to be reasonably neutral. In a more detailed embodiment, the controlling step moves limited-duration resources back to neutral by permissively charging based on the state of change.

In another aspect the system/method controls dispatch of electricity on the electrical power grid including enabling fast-ramping resources, where the controlling step utilizes fast-ramping resources to respond to the changes of total ACE correction need, and gradually replaces deployment of fast-ramping resources with deployment of slow-ramping resources over time.

In another aspect the system/method controls dispatch of electricity on the electrical power grid including enabling fast-ramping resources, where the controlling step monitors resource energy levels state of change and assists resource state of change (SOC) back to neutral whenever the situation permits.

BRIEF DESCRIPTION OF THE DRAWINGS

FIG. 2 illustrates design principles for AGC enhancement for fast-ramping resources according to an exemplary embodiment;

DETAILED DESCRIPTION

Figure 20:
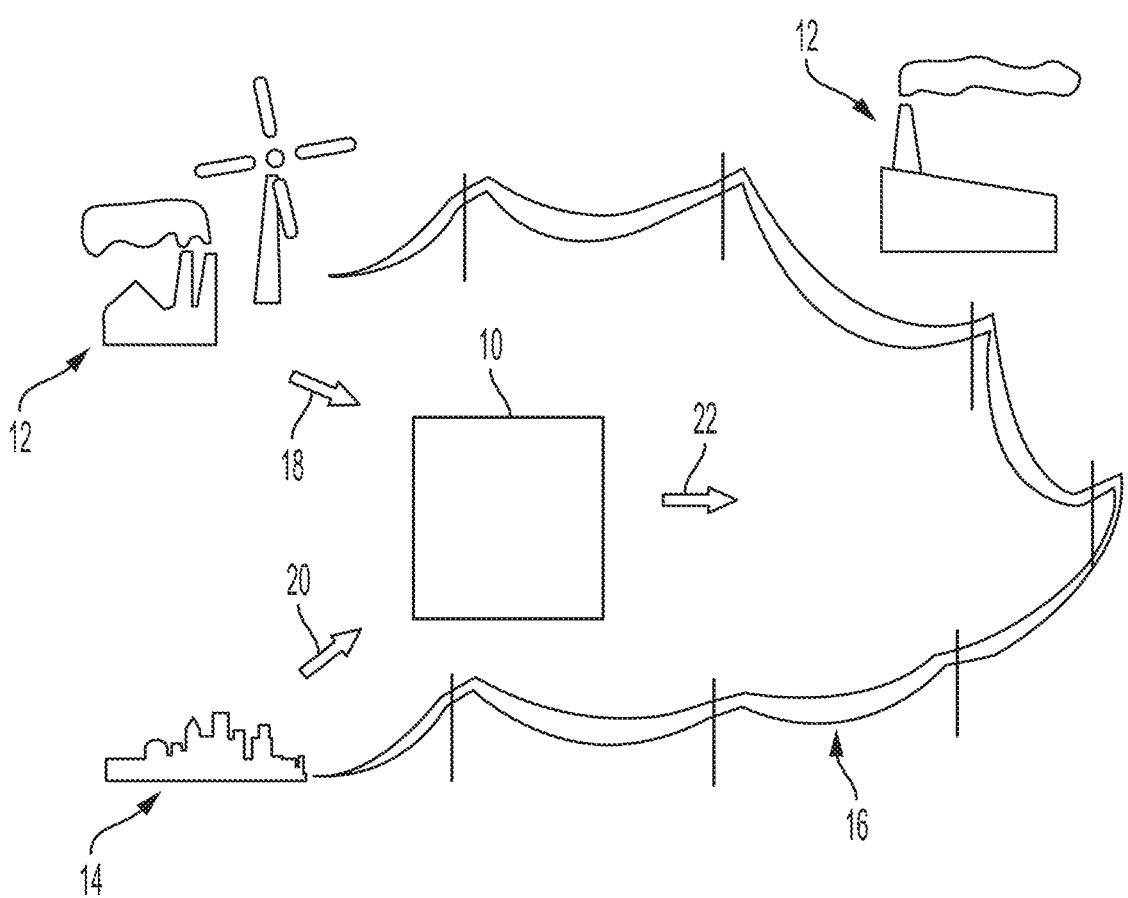
FIG. 20 is a block diagram representation of an exemplary electrical power grid system according to the current disclosure.

Referring to FIG. 20, an exemplary controller 10, according to the current disclosure, administers the market for electricity producers 12 and users 14 on an electric power grid 16. Some exemplary functions of the controller 10 include monitoring energy transfers on the transmission system, scheduling transmission service, managing power congestion, operating DA and RT energy and operating reserves ("OR") markets, and regional transmission planning. The controller 10 will process the offers 18 and bids 20 to determine commitments of electrical power and then controlling the dispatch 22 of electricity on the grid 16 based upon the commitments. Some or all of the electricity producers 12 may utilize slow-ramping resources, such as resources that have ramp rates lower than 80 MW per minute; and some or all of the electricity producers 12 may utilize fast-ramping resources, such as fly wheels, battery storage and the like.

Figure 1:
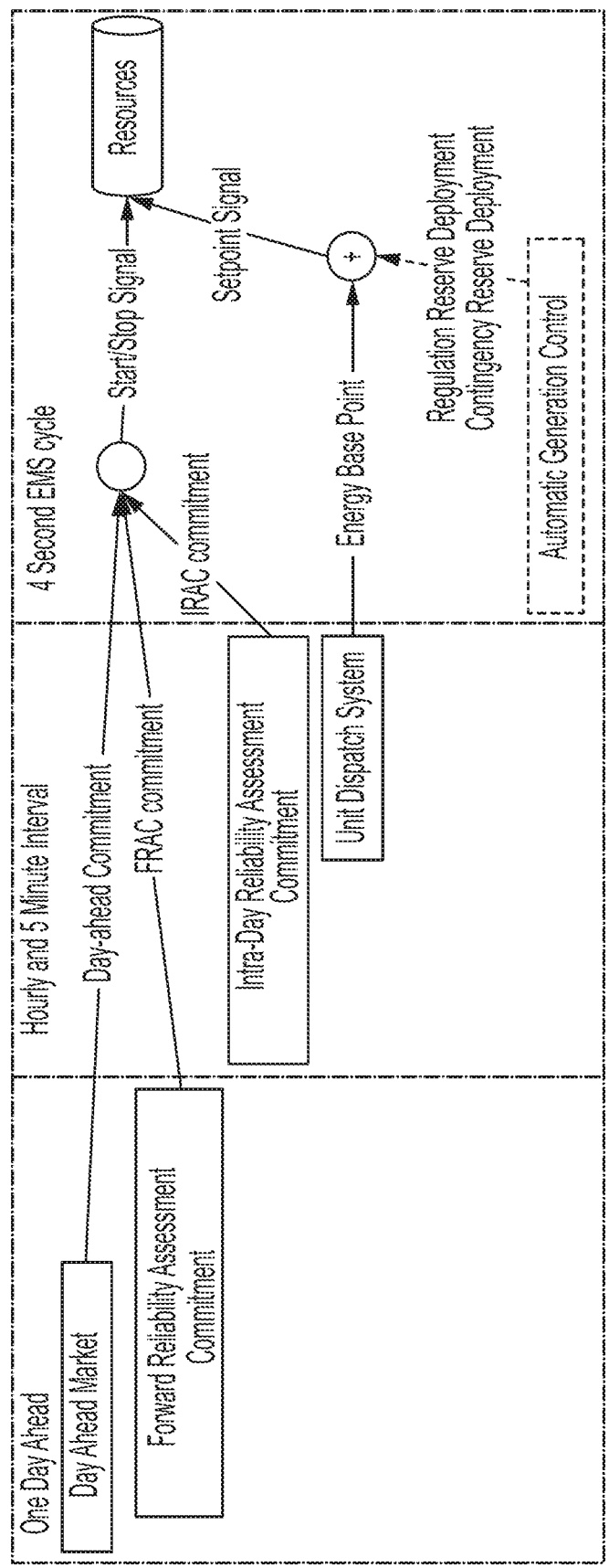
FIG. 1 illustrates exemplary signals that generation resources receive from the controller.

The current disclosure related generally to electric power grids 16, and more particularly to methods, apparatuses and systems for controlling and operating such electric power grids 16 to enhance automatic generation control (AGC) for fast-ramping resources in such power grid systems. AGC is a mechanism for ensuring reliability by balancing power in real time. The current disclosure provides approaches for enhancing how such controllers 10 deploy fast-ramping resource for balancing to better utilize the capability of resources while maintaining reliability. AGC is an essential part of the controller's 10 system, for example, sending 4-second control signals to resource fleet and maintains ACE within a limited range for system reliability. As shown in FIG. 1, there are multiple signals that the controller sends to resources throughout different time periods. Some enhancements disclosed herein focus on the regulating reserve deployment part of the signal. Under normal operation conditions, regulating reserve deployment is a part of the dispatch signal sent to resources together with an energy base point on real-time basis.

As shown in FIG. 2, to meet the objectives of maintaining or improving reliability, efficiency and flexibility, embodiments of the current disclosure offer five guiding principles for the new enhancement design.

Principle 1—Maintain system reliability before meeting individual unit needs. In order to continue to provide regulating reserve, energy-limited resources need to charge and discharge. New enhancements should provide mechanisms to support the application of this type of resource for regulation service. However, these mechanisms should not sacrifice system reliability objectives.

Principle 2—Avoid fast/slow signal competition. New designs should maintain or increase efficiency and avoid competing signals that counter system need. For example, if AGC sends opposing signals to different resources, one resource could support ACE correction while the other could hurt it. System efficiency would be reduced and system reliability could be at greater risk if the "hurting" signal obscures the "helping" signal.

Principle 3—Leverage the use of slow-ramping resources. As much as AGC should leverage the capability of fast-response resources, it should also leverage the use of slow-response resources. The design should ensure that slow-response resources, with their limited ramp rate, can follow this signal and help in ACE correction.

Principle 4—Avoid charging/discharging energy-limited fast-ramping regulating resources by deploying regulating reserve from slow-ramping resources.

Principle 5—Ensure reliability while maximizing the use of a variety of technologies. Different types of resources have different energy durations. The enhanced design should send signals that reflect the system need while accommodating limited-energy resources to the greatest extent possible. For example, an exemplary design should avoid the use of fixed-energy duration signals to meet the needs of certain resources.

The AGC design can be completed by several smaller design elements. For each one, possible options are available.

Input Signal Design—Two options are available for the new enhanced AGC logic. 1. Designing fast-ramping resource logic to respond directly to raw ACE. This first option allows much more freedom to the new design. However, due to the complexity of the power system (or power grid), the complete re-development of a logic may prolong the development cycle and could introduce additional risk to system reliability at the early stages of implementation as it takes time to gain operational confidence and signal tuning for stabilization. 2. Designing fast-ramping resources to respond to total ACE correction need. This second option uses the current AGC logic that derives total regulating reserve deployment. The new enhancement derives regulating reserve deployment for fast and slow resources from that total number. Since this approach fully utilizes the existing logic and software, it would shorten the development cycle of new AGC enhancement. It also would reduce the risk of implementation of an enhanced AGC design. The flexibility of the existing AGC implementation (FIG. 3) ensures that it can work as foundation for enhancement. The existing logic has parameters that could be tuned to work with fast-ramping resources Fast Signal Design and Coordination of Fast and Slow Signals—The fast signal design determines the signal that AGC would send to fast-ramping resources. Three options are discussed: use the existing priority group logic, use a fixed duration filter or use a custom "Fast-First" logic.

1. Using a signal from existing priority group logic—The current logic deploys fast ramp resources first and un-deploys them last. In this scenario, energy-limited resources were pushed to their limits frequently and the gain in reliability performance was minimal.

Figure 3:
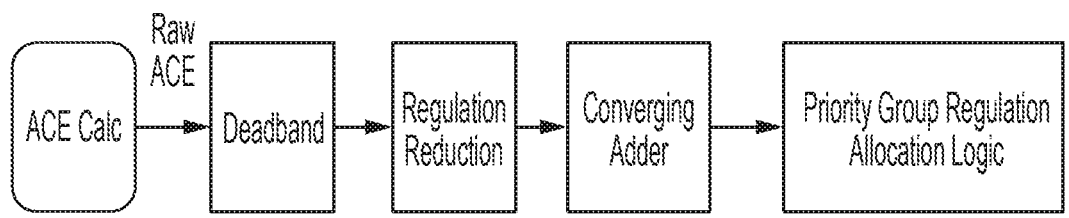
FIG. 3 is a block diagram illustrating current (prior art) AGC logic.
Figure 4:
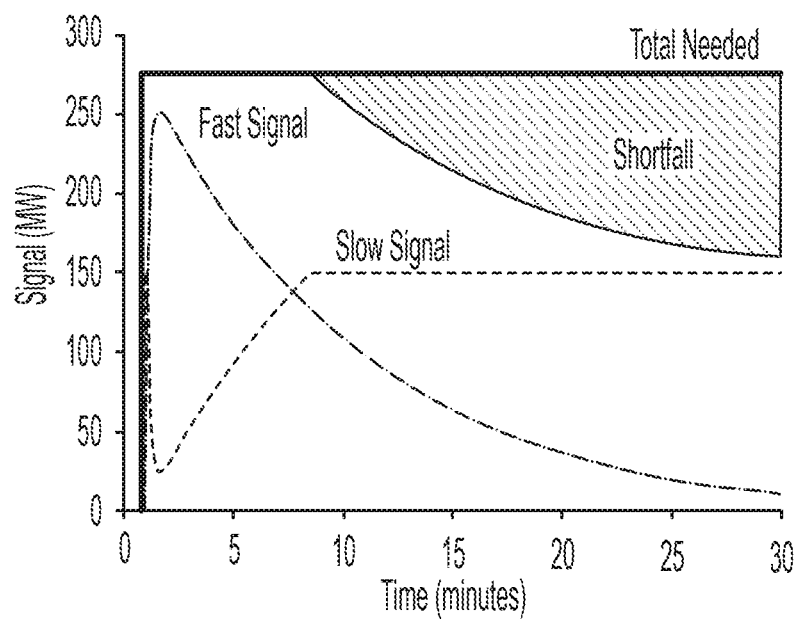
FIG. 4 is a diagram illustrating fast and slow signals from a fixed duration filter.

2. Use a signal from fixed duration filter—Such a filter would be placed between the convergence adder and priority group regulation allocation logic, as illustrated in FIG. 3. A study simulated a scenario in which the fast-response resources respond to the filtered ACE need, and then the fast signal is pulled back to zero within a fixed duration (see, FIG. 4). This approach allows for a fixed duration deployment of fast-ramping resource. Such filters can result in insufficient response to the total ACE correction needed. In the example in FIG. 4, after 10 minutes of persistent deployment, the fast signal from a 30-minute filter withdraws and the slow resource reaches the limit of cleared reserve MW. The total signal starts to deviate from the total needed. System frequency decreases due to insufficient regulation deployment support. This shortfall could become increasingly significant where the percentage of fast-ramping resources participating in the regulating reserve increases. In some embodiments, this approach could potentially force a hard limit on the percentage of fast-ramping resources in regulating reserve to ensure reliability. A slightly varied approach of the fixed duration fast filter is to employ a block-fixed duration fast filter. It is based on the same filter approach. It sends fast-ramping resources a block-shape signal. For example, when the filter output (after the convergence adder) exceeds 15 percent of cleared regulating reserve, AGC sends fast-ramping resources the fully cleared regulating reserve amount. When the filter output is below 15 percent of the cleared regulation amount, it sends zero as a signal. This way, the fast signal avoids small changes in the signal that could be ignored by the resource's dead band. In some embodiments, this signal approach may have similar issues as the fixed duration filter described above.

3. Custom Fast-First Logic. In this scenario, the signal lets fast-ramping resources respond to the changes of total ACE correction need. It also gradually replaces deployment of fast-ramping resources with deployment of slow-ramping resources over time. Fast and slow resources work together to meet the total ACE correction needs at all times. The detailed description and formula is presented below.

Energy Neutrality of Fast Signals—Many fast-ramping resources are energy-limited, such as battery storage or fly-wheel storage. Although AGC enhancement for fast-ramping resources is resource neutral, the special characteristics of energy-limited resources may be addressed. Several options to determine how to accommodate the limited-energy duration of certain resources are discussed. Guaranteed/conditional guaranteed energy neutral; Monitor resource energy levels (state of charge) and assist resource state of charge (SOC) back to neutral whenever the situation permits; and addressing energy neutrality problem outside of the AGC signal.

1. Guaranteed/conditional guaranteed energy neutral—Energy neutrality means that resource energy levels are kept within limits over a given time period. An energy-neutral signal would prevent a resource from becoming energy full or empty, and therefore unable to provide service. Some implementations of fast signal logic guarantee or conditionally guarantee an energy-neutral signal for fast-ramping resources. To guarantee energy neutrality, the fast signal would have a minimal amount of energy component over a fixed time period. Uncertainties in the system makes this difficult to implement. With a non-neutral ACE correction requirement, guaranteeing fast signal neutrality over a time period needs to release or absorb energy to maintain a neutral position. Some implementations use slow-ramping resources to provide that part of energy imbalance. This need for extra energy imbalance to maintain energy neutrality of the fast signals may not contribute to ACE correction. Further, sourcing this imbalance energy from other regulating resources may not be an economical option for a given market.

2. Monitor resource energy levels (state of charge) and assist resource state of charge (SOC) back to neutral whenever the situation permits—A fast signal to address total regulation deployment movement and a slow signal to address persistence would reduce the energy component of a fast signal. Also, by monitoring the resource energy level, a permissive-charging, a fast signal could help to bring the resource back to neutral. A detailed approach is described below.

3. Addressing the energy neutrality problem may not be limited to the AGC signal only. Energy neutrality could be improved by reducing the persistent energy component of system ACE. Or it could use energy dispatch to counter the energy components in regulation deployment signals to each individual resource. Limit the persistent component of the system's ACE—Reducing the energy component in the root signal (the system's ACE) would help energy-limited resources move back to energy neutral. To do that, the controller would review the causes of persistence and explore redesign of AGC-UDS interactions. Coordinate dispatch with limitations of limited-duration resources—By monitoring energy levels, the controller's energy economic dispatch process could incorporate charge/discharge energy requests per participant into the optimization and provide a basepoint of intentional bias to help drive resources back to an energy neutral zone. This option involves market clearing enhancements.

Testing, verifying and comparing the different design options. Test were run through a simulation and analysis tool called KERMIT. The information gathered from these models and tools were used to construct the exemplary solutions described below. In order to meet the requirements of this enhancement, all design options are evaluated on the objectives of reliability, efficiency and flexibility. Each objective uses a different method to gather meaningful data.

Figure 5:
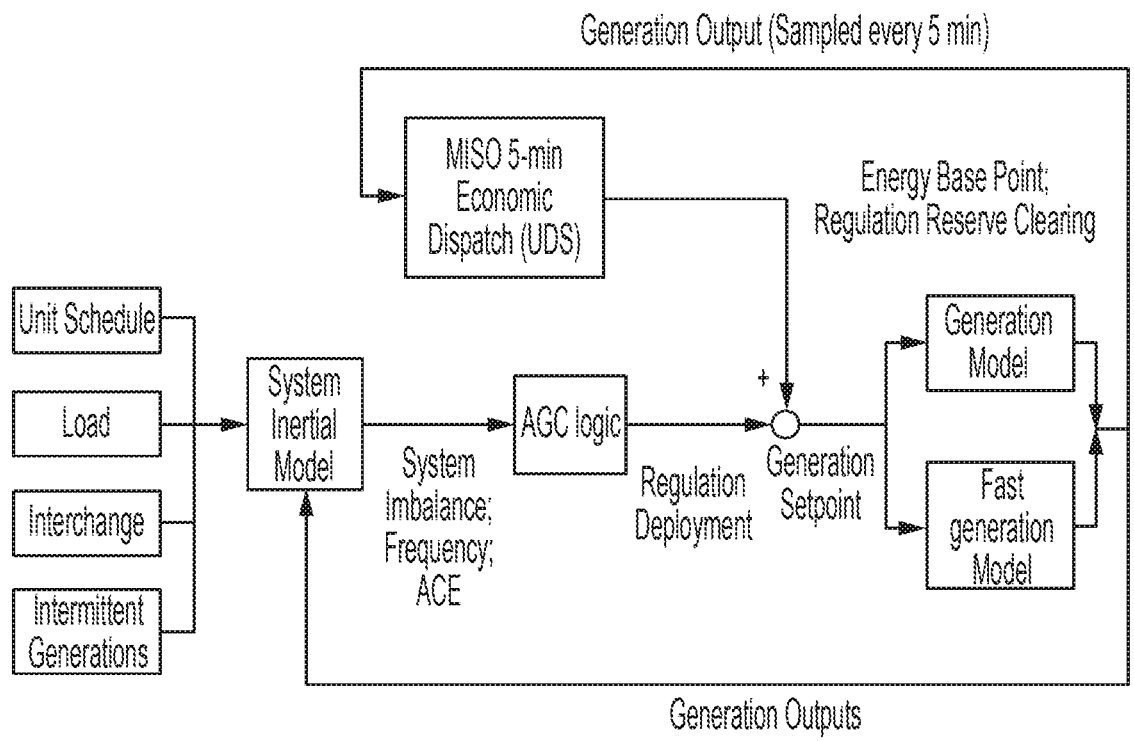
FIG. 5 is a flow diagram representation of the simulation model setup with KERMIT described herein.
Figure 6:
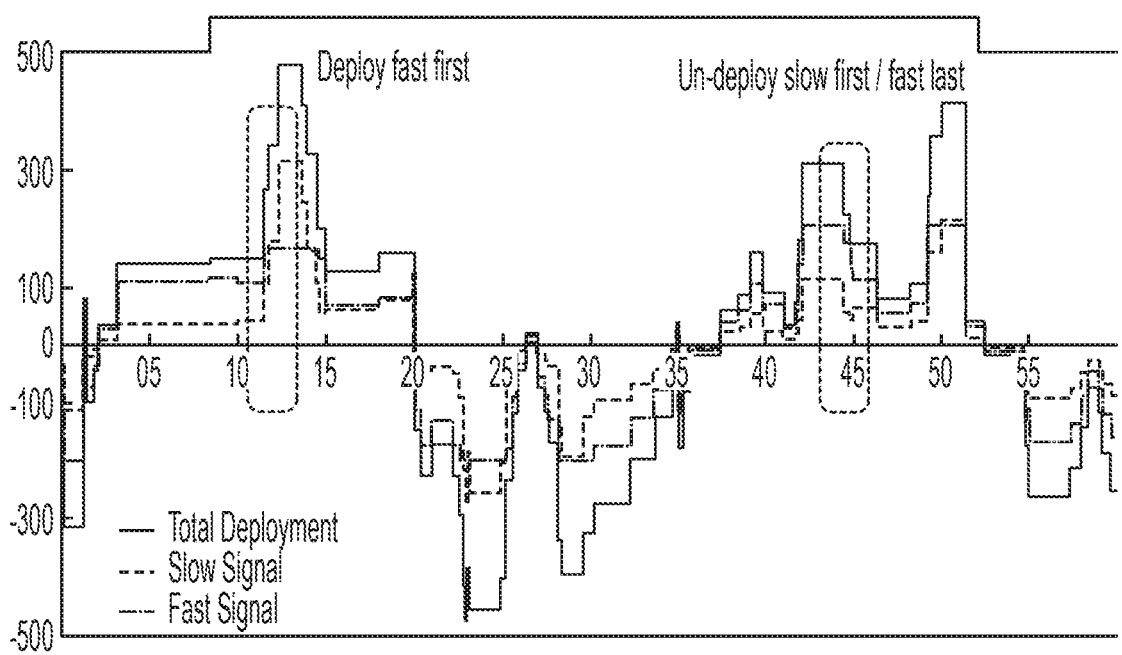
FIG. 6 is a diagram representing sample signals from current (prior art) AGC logic.

Reliability evaluation is at the core of this study. The exemplary design option has to maintain at least the current level of reliability performance as well as adapt for future system needs. In this evaluation, KERMIT was used as a simulation tool to generate ACE and frequency deviations. FIG. 5 shows the basic flow of the KERMIT simulation. The CPS1 score was then calculated over the simulated period. CPS1 performance measure provides a continuous performance score, other than just a discrete number of violations as measured for BAAL compliance. This mechanism provided for an easy comparison between options.

Efficiency evaluation—In comparing the potential efficiency-related benefits of an enhanced AGC, the potential for new designs to reduce regulating reserve requirements or reduce total product cost of generation were explored. 1. Reduce regulating reserve requirement while maintaining the same reliability performance. This is estimated by simulating and measuring system performance while gradually reducing the regulating reserve requirement to find the floor. 2. Reduce production cost of controller's generation while serving load and maintaining the system reliability. This is estimated by re-executing the controller's unit commitment and economic dispatch with new, fast-ramping resources modeled into the system.

Flexibility Evaluation—1. A bulk electric power system with more fast-ramping capabilities would demonstrate more flexibility while facing increasing variability. An AGC enhancement could better utilize fast-ramping resources to support reliability and efficiency. It is expected that greater usage could result in increased compensation, which could provide an incentive to attract new technologies to participate in markets and operations. To explore the potential shift in compensation, sample resource revenue realization was calculated, as discussed below. In addition, it is recognized that some fast-ramping resources may also be energy limited. How different designs might affect the ability of such resources to continuously deliver regulating reserve service over time was explored. Fast-ramping resource revenue realization for serving regulating reserve in the controller's market was calculated. The calculation includes a net energy charge/payment, a regulating reserve capacity payment and a regulating reserve deployment mileage payment.

Flexibility Evaluation—2. Calculate undelivered regulating reserve mileage due to energy limitations. The undelivered regulating reserve mileage is calculated as the percentage of deployment mileage when resource outputs are constrained by energy limits over total regulating reserve deployment signal mileage. The intent is to develop a design that enables the participation or use of energy-limited, fast-ramping resources to the greatest extent possible, while balancing reliability needs.

KERMIT simulation. FIG. 5 shows a flow chart simulation model setup with KERMIT. With the model set up, KERMIT was calibrated to produce expected results with all production inputs based on historical days. Calibration included adjusting model parameters and modelling uncertainties in the system. For example, for various reasons, generators (in real world) only partially followed the dispatch instructions (set point) from the controller. To reflect this performance in KERMIT offset were introduced into units' model output. The offset was the bias between the ramped historical instructions (set point) and historical outputs. With all the effort of calibration and adjustment, the KERMIT model generated very close frequency deviations/ACE with historical data.

With KERMIT in place, various scenarios were set up to evaluate different design options. Scenarios were set up to simulate the performance of different design options under different levels of regulating reserve requirement, penetration levels of fast-ramping resources and penetration of renewable resources. Results of these studies are summarized below.

1. Different design options—as described above, fast signal design options, the scenarios included proportional, fixed duration filter, blocked fixed duration filter, fast-first without permissive charge, and fast-first without permissive charge design options. 2. Different penetration levels of fast-ramping resources—these scenarios evaluated whether the recommended design would work with different stages of fast-ramping resource penetration in the future. The different penetration levels of fast-ramping resources were simulated by setting different percentages of fast-ramping resource cleared regulation capacity over the total regulation requirement. This study simulated system performance under various sample situations of 0-100% regulating reserve capacity provided from fast-ramping resources. 3. Different regulating reserve requirements—This setup of scenarios was used to evaluate the efficiency of the recommended designs. The study evaluated potential opportunities for reducing the regulation requirement while maintaining reliability performance. The system performance was simulated with assumptions of 0, 25%, 50%, 90% and 100% of the existing controller's regulating reserve requirement. 4. Future system scenario with increasing renewable resource penetration—future system scenarios are defined based on an estimation of 6,000 MW increased wind capacity and 2,400 MW increased solar generation in 2026. The variable outputs of increased renewable resources were represented with 4-sec data which was engineered by assuming a proportional increased standard deviation.

Exemplary solutions following from the study. The study identified areas of improvement in the existing AGC system when integrating fast-ramping resources. With this study and evaluation, exemplary enhancements for AGC were developed—including the implementation of an exemplary 'Fast-First' logic that will create fast signals to meet stated goals.

Exemplary Enhancement—Fast Ramping Resources Qualification Standard. Four options are provided for a qualification standard for fast-ramping resources. Exemplary embodiments use any one or combination of the following four options as a qualification standard for fast-ramping resources.

Option 1—Fast-ramping resources offered at a ramp rate must exceed a certain threshold. The definition of fast-ramping resources could be tied to a fixed threshold of ramp rate capability. This would be based on an initial test during registration but not evaluated on a more continuous basis. This definition of fast-ramping would ensure that resources called upon for fast-ramping response meet a minimum capability and in turn should be able to promptly respond to ACE and provide correction quickly. However, it would not account for actual response.

Option 2—Fast-ramping resource performance should exceed a certain standard. A performance-based threshold would account for true contribution to system need. However, a mechanism would need to be created to continuously validate qualification. There are two ways that fast-ramping resources' performance might be evaluated. (1) UDS or AGC can disqualify a resource as a fast-ramping resource based on a predetermined performance standard in real-time until the requirement is met; and/or (2) settlement performance threshold for fast-ramping resources could be tightened. If the controller's settlement system determines that a resource in a certain period is below performance standards, the controller withdraws part or all of the regulation payment. This settlement rule currently exists for regulating resources. The standard is 70 percent of instruction.

Option 3—Fast-ramping resources should be able to continuously provide regulating reserve service over a period of time which is longer than a minimal duration. As the controller clears real-time energy and ancillary service in every 5 minute interval for the target system condition of 10 minutes later, the controller's regulation market clearing engine is not able to reasonably predict availabilities of any resource with energy duration less than 10 minutes. Unpredictable availability could risk degrading the reliability of the MISO system.

Option 4—Energy-limited duration resources should provide state-of-charge information.

Figure 7:
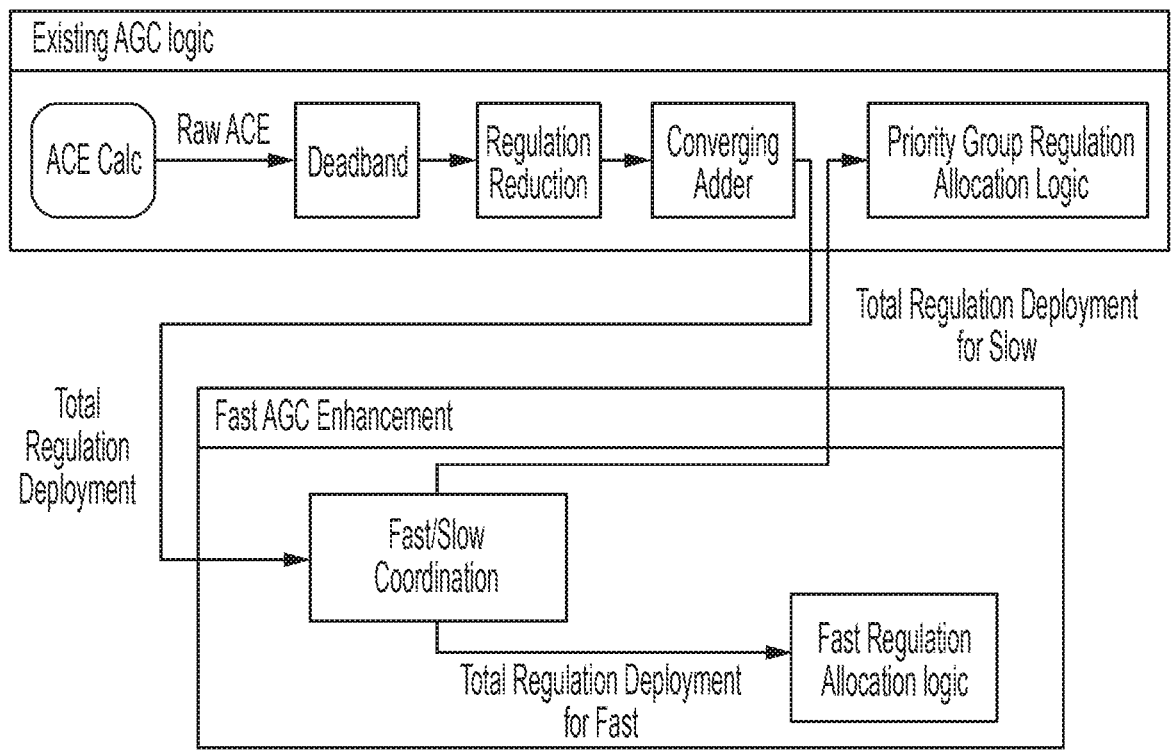
FIG. 7 is a block diagram representation of AGC logic enhancement according to an embodiment of the current disclosure.

Enhanced AGC Logic. Certain embodiments utilize enhanced AGC logic based on the existing system. This approach would greatly reduce the cost and complexity of the implementation. As shown in FIG. 7, the logic would take total regulation deployment as an input signal. Then, the total signal would be split into total deployment for fast resources and total deployment for slow resources. A slow signal would continue to use the existing priority group logic to allocate to individual resources. The total fast signal would be fed into the new fast allocation logic and distributed to individual fast-ramping resources.

Fast-First Fast Signal Design. The fast signal design addresses the question of what kind of signal fast-ramping resources will receive. To enhance the current AGC logic with respect to fast-ramping resources, the Fast-First logic realizes deploy/un-deploy fast-ramping resources first by letting the fast signal respond to changes of total regulation deployment.

$$R_{fast}'(t)=[R_{total}(t)-R_{total}(t-1)]+R_{fast}(t-1)$$

Where $R_{total}(t)$ AGC deployed total regulating reserve for MISO at time slot t $R_{fast}(t)$ AGC deployed regulating reserve on fast-ramp resources at time slot t $R_{fast}'(t)$ The term of fast signal responding to changes of total deployment By doing this, the new logic takes advantage of the fast-ramp feature and promotes the response rate of the overall fleet of regulation resources. It increases the fast signal regulation deployment mileage, which therefore increases the regulation mileage payment, creating a greater incentive for fast-ramping resources in the market.

Fast/Slow Signal Coordination. Some fast-ramping resources, such as energy storage, are energy limited. If they are required to provide continuously single direction output to the grid, they cannot fulfill the request in extended periods of time due to energy limits. To take advantage of their fast-ramp capabilities for ACE correction while reducing their energy outputs, fast/slow resources could work together towards meeting system need. The Fast-First logic coordinates fast and slow signals to allow fast-ramping resources to enhance system response capability and slow-ramping to provide persistent support by gradually replacing deployment on fast-ramping resources with slow-ramping resources.

The Fast-First logic has two characteristics: gradual replacement and alignment.

Fast-First gradually replaces deployment on fast-ramping resources used after the first response. The following formula shows how Fast-First logic could be designed to achieve the goals of fast-ramping resources responding to transitional changes and the slow resources responding to persistent deployment. The fast—ramping resource signal is made up of multiple components. The first term, $R_{fast}'$, orients fast-ramping resources to respond to transitional changes. The second term, $\varepsilon\{\ldots\}$, coordinates the slow and fast response resources to meet the total ACE correction need. As slow response resources ramp, the fast response resources will adjust according to the total need. The rate, at which fast-ramp resources adjust, is determined by $\varepsilon$. This would result in greater movement of fast ramping resources, and the ability to use slow ramping resources for persistent signals as needed.

$$R_{fast}'(t)=[R_{total}(t)-R_{total}(t-1)]+R_{fast}(t-1)$$

$$R_{fast}(t)=R_{fast}'(t)+\varepsilon^*\{\text{sign}(R_{total}(t))^*\max[|-RClr_{slow}(t), 0]-R_{fast}'(t)\}$$

Where $RClr_{slow}(t)$ UDS cleared regulating reserve MW on slow-ramping resources at time slot t $\varepsilon$ Damping factor, which is a positive value and less than one The slow signal is created by subtracting the fast signal from the total deployment.

$$R_{slow}(t)=R_{total}(t)-R_{fast}(t)$$

Where $R_{slow}(t)$ AGC deployed regulating reserve on slow-ramping resources at time slot t Overall, the fast-signal responds to instant changes of total deployment and gradually adjusts so as to make room for slower ramp resources as they catch up. This approach provides slow-ramping resources with smooth changing signals. It would create a slow signal, making compliance easier.

Figure 8:
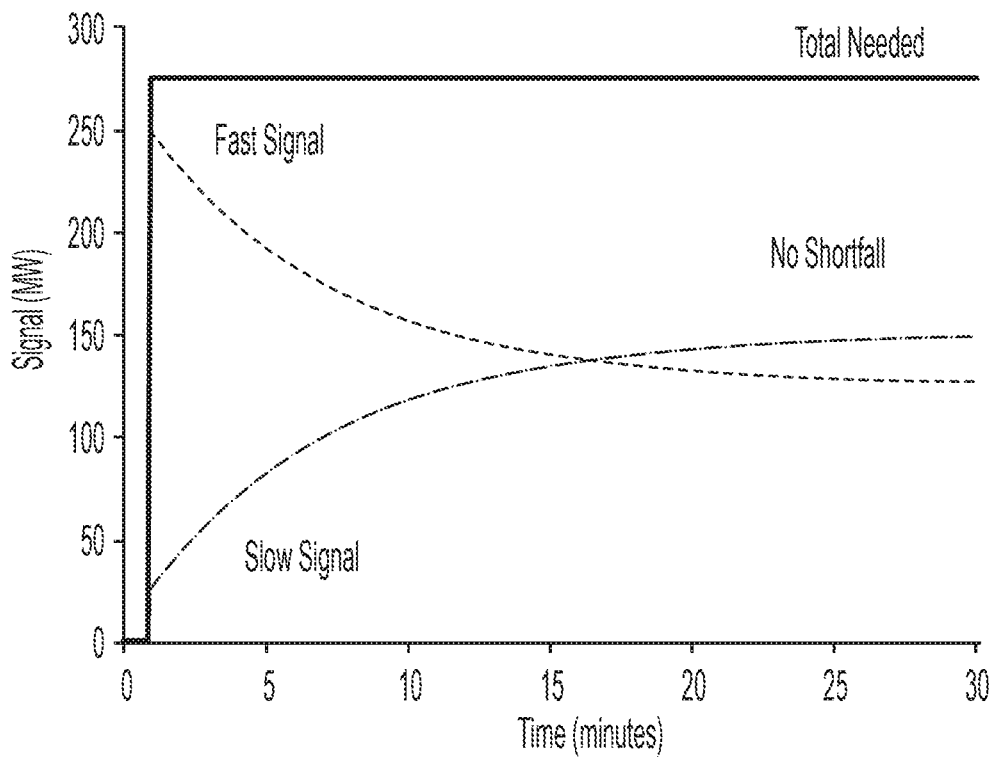
FIG. 8 is a diagram representing sample signals from fast-first logic.

FIG. 8 demonstrates how the logic works. It assumes the total deployment is a step signal from zero to 275 MW. Also, the fast-ramping resource cleared 250 MW regulating reserve in 5-minute UDS and the slow-ramping resources cleared 150 MW regulating reserve. The initial response for fast resources is 250 MW and slow resources only need to provide 25 MW. As time goes by, the fast signal is pulled back and the slow signal starts replacing the fast signal to provide the required full amount of 150 MW. The fast signal is still needed to provide 125 MW to the system. Together with slow and fast-ramping resources, total deployment satisfies the ACE correction need in all times.

Fast-First aligns both direction of slow and fast signal with total deployment. If fast signals only respond to changes of total deployment, there could be a scenario in which a fast signal could run in the opposite direction of total deployment. For example, in a previous cycle, a fast signal is 100 MW and a slow signal is 300 MW. In a current cycle, total deployment is reduced from 400 MW to 100 MW. By responding to total deployment change, a fast signal would reduce to 100 minus 300 to equal −200 MW. The slow signal would keep at 300 MW. Fast signal at −200 MW is in the opposite direction to total deployment requirement of 100 MW. In this situation, if slow resources somehow failed to follow the AGC slow signal, say a slow actually deploys just 100 MW and with a fast signal at −200, actual regulation response would be −100, which is opposite to the amount of ACE correction need. In this scenario the signals worsen the situation and make ACE correction difficult.

Figure 9:
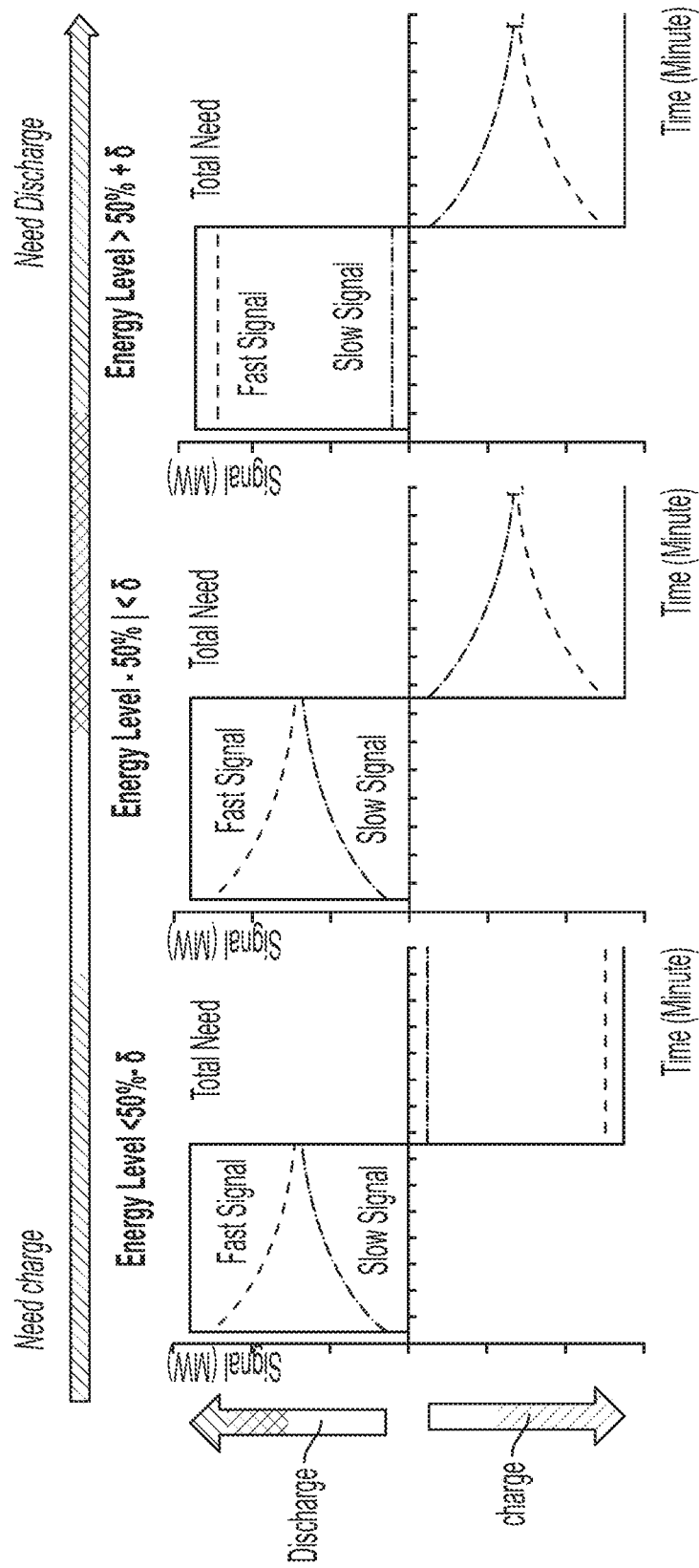
FIG. 9 is a diagram representing sample signals utilizing exemplary permissively charging signals scenarios.

Fast Signal Energy Neutrality. With the process of gradually pulling back regulation deployment on fast-ramping resources, Fast-First logic could reduce energy components in the fast signal. However, with knowledge of resource energy levels, AGC logic could choose to only pull back when the energy component drags resource energy levels away from the energy neutral point. If the energy component helps to return energy levels back to neutral, AGC should keep that part of the energy in the signal. Therefore, Fast-First logic moves limited-duration resources back to neutral whenever the situation permits, by Permissively Charging, based on the state of charge. As shown in FIG. 9, permissively charging works differently under different situations.

Figure 10:
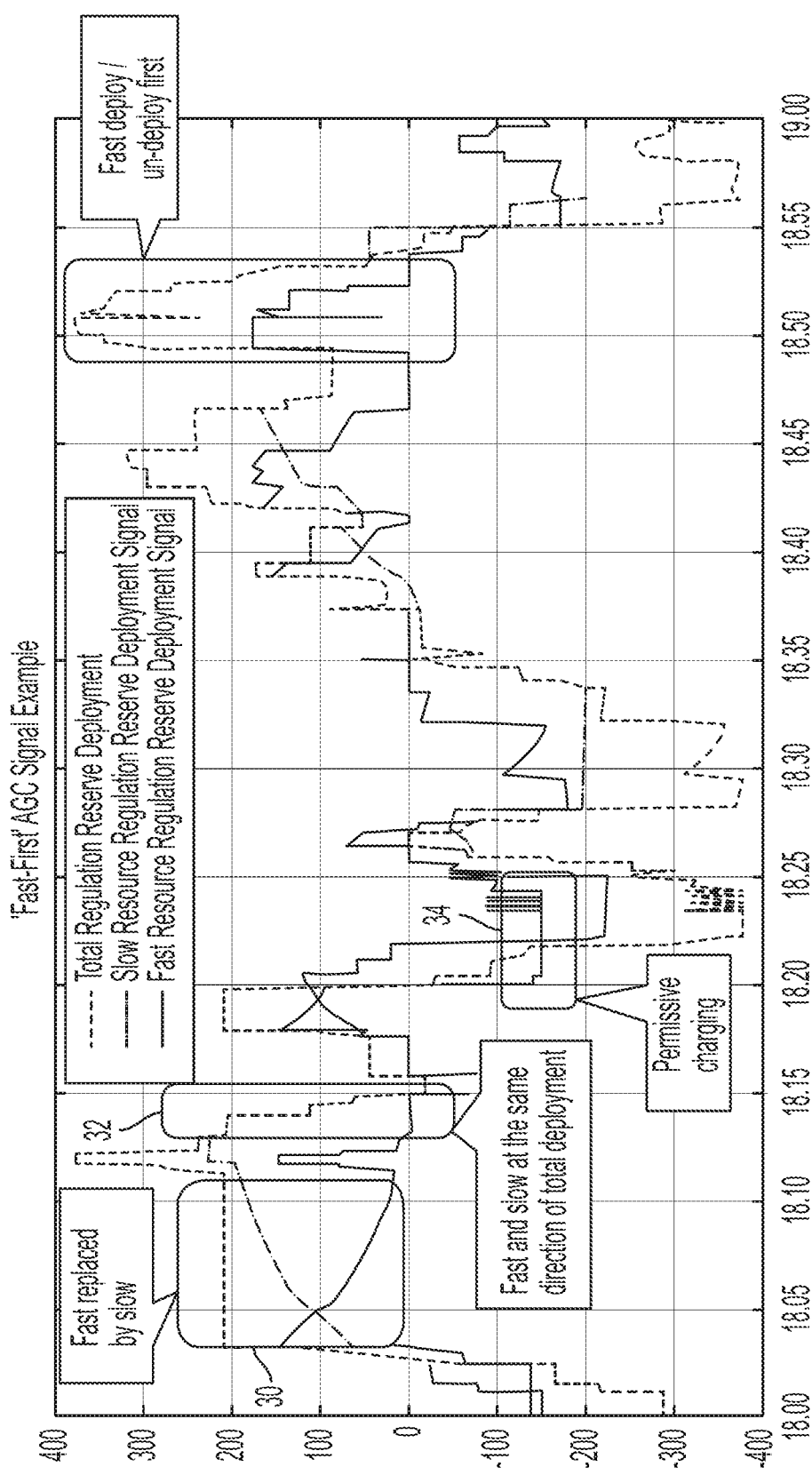
FIG. 10 is a diagram representing sample signals from exemplary enhanced AGC logic according to the current disclosure.

FIG. 10 provides a simulation of AGC signals for different Regulation deployments with a combination of Fast and Slow Resources in the mix. This provides a view of how exemplary Fast-First logic according to the current disclosure may work in real-time system conditions. As shown in block 30, during the time interval 18:00 to 18:10, the initial regulation deployment happens on the Fast Ramping Resource (usually have limited energy). This deployment is then shifted to the Slow Ramping Resources (usually have not energy limitation). As the Slow Ramping Resources respond to this signal the deployment on the Fast Ramping Resource would be decayed down to preserve their limited energy capacity. In the second box 32 before time 18:15 the regulation deployment need came down to zero so the regulation deployments on both Fast and Slow resources are zeroed out. The block 34 around 18:20 shows the concept of Permissive Charging wherein the overall regulation deployment is trying to move the Generation down. During this time period the controller opportunistically lets the Fast Ramping Resources that are energy limited to charge up as much as possible. Another observation that can be drawn supporting the design principle (Fast First) is that any deployment or undeployment of the regulation is done on the Fast Ramping Resources, first, before moving that requirement onto the slower ramping resources.

Figure 11:
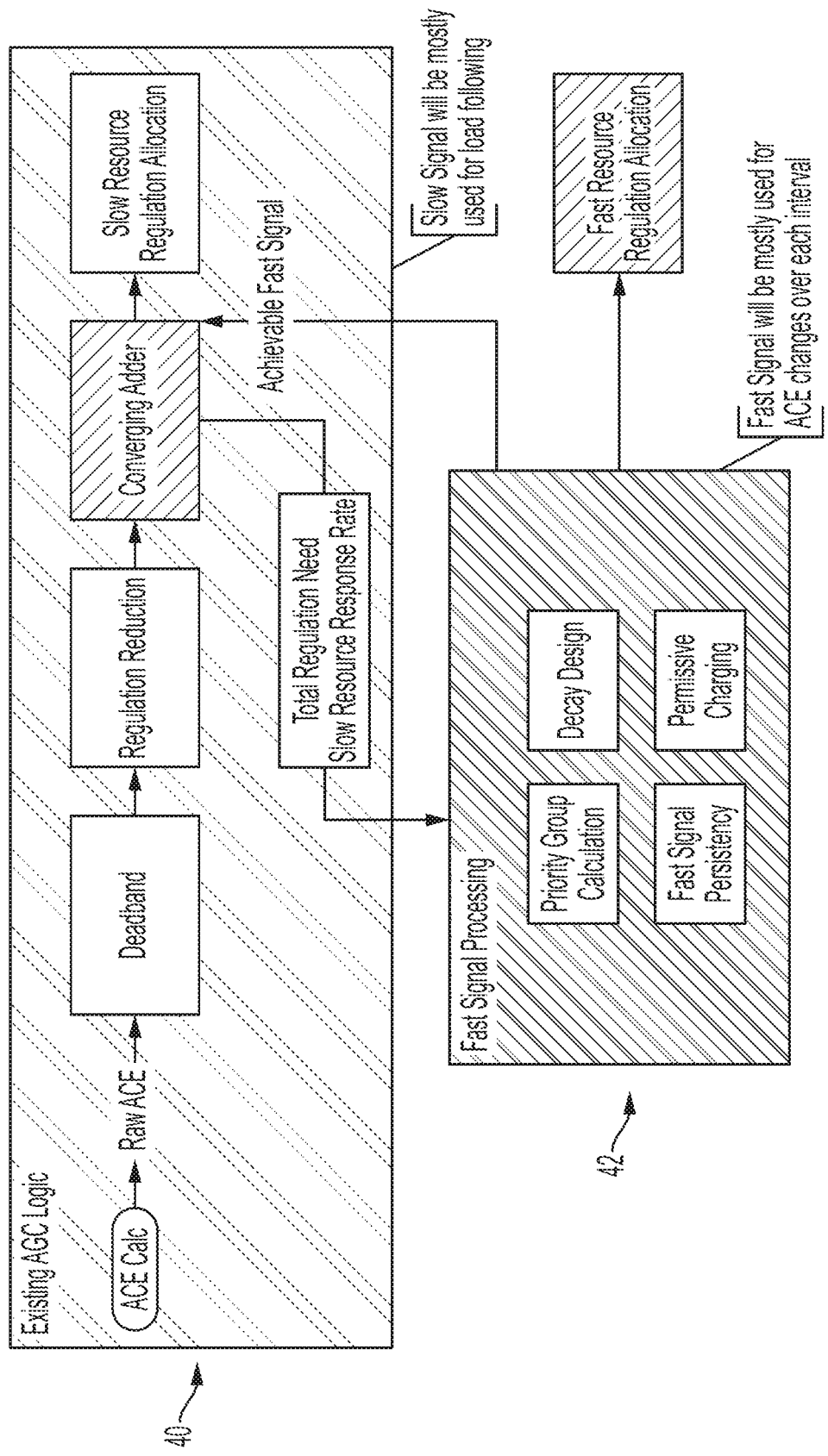
FIG. 11 is a block diagram representation of another AGC logic enhancement according to an embodiment of the current disclosure.

FIG. 11 shows exemplary AGC processing blocks. The top portion 40 shows the conventional signal processing and the bottom portion 42 shows exemplary new blocks for Fast Signal processing.

Figure 12:
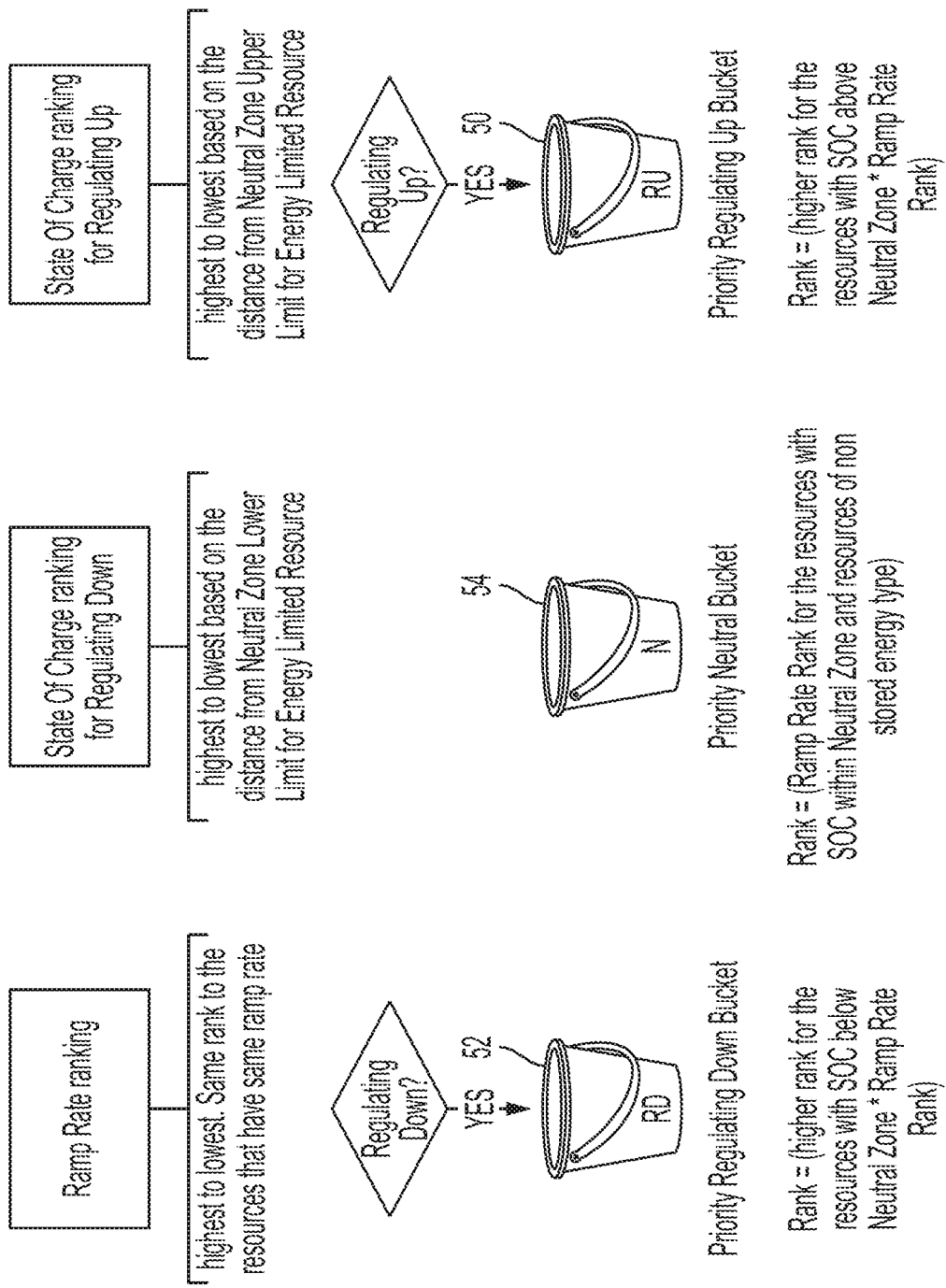
FIG. 12 is an illustration of priority group calculation in exemplary AGC logic enhancement according to current disclosure.
Figure 13:
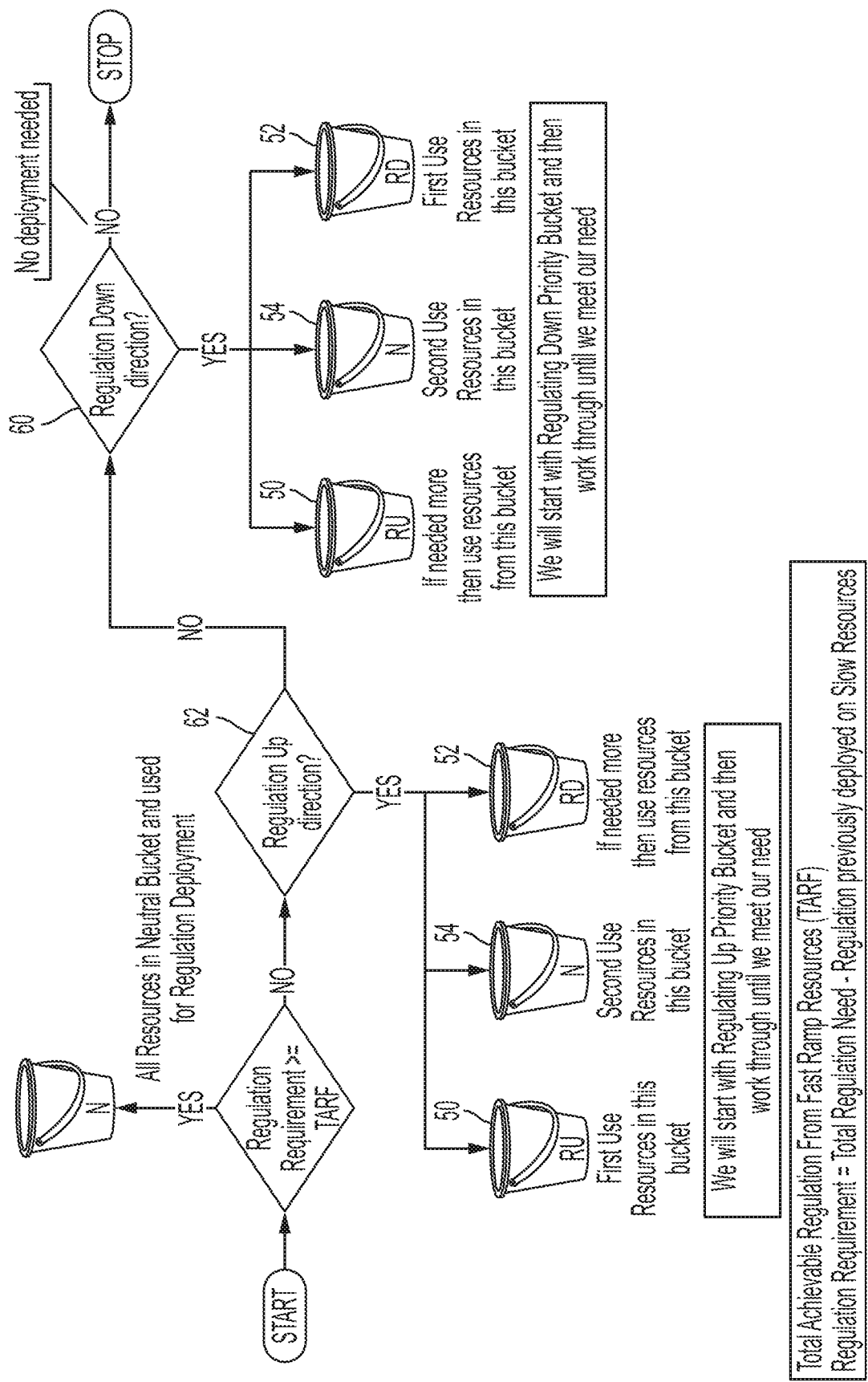
FIG. 13 is a flow diagram representation of exemplary AGC regulation deployment logic for Fast Ramping Resources with Permissive Charging.

FIG. 12 illustrates priority group calculation in AGC. For Fast Ramping Resource, Resource deployment ranking is calculated looking at the Total Regulation Need, Regulation direction and Resource position with respect to the Neutral Zone. Neutral Zone is made up of two limits based on Charge of Stored Energy Resource—an Upper Charge Limit and a Lower Charge Limit. The Stored Energy Resource would be at its optimal (Performance, life expectancy, etc) when the charge is maintained in that region. Fast Ramp Resource Ranking will be further derived using Resource Ramp Rate and by the distance the Resource is from the Neutral Zone with respect to its State of Charge. For any given AGC interval the Resources will be placed into one of the three buckets looking at the Regulation Need at that interval (i.e. whether we are Regulating Up 50 or Regulation Down 52). Resources that are not of Stored Energy Type (i.e. the Resources that do not have a need to charge from the grid to provide Regulating Reserves) are placed in a Neutral bucket 54 and assign rank 1 for State of Charge. For the Resources in the Regulating Up 50 or Regulating Down 52 buckets the Resource that is farthest away from the Neutral limit point will be assigned rank 1. Further, Resources with highest Ramp Rate will be ranked 1 for the Ramp Rate criteria. Resource deployment in each bucket will start with the Resource that has the lowest Rank FIG. 13 illustrates AGC regulation logic for Fast Ramping Resources with Permissive Charging. If the regulation deployment in an AGC interval is Regulating Down as shown in decision block 60, we will start with Regulating Down bucket 52 and then move to the Neutral bucket 54 if we need more movement. Once this bucket is also exhausted, we will look at how much Regulating down movement we can get from Slow Ramping Resources. Even after this, if we still need more movement we move to the third bucket 50. The Resources in the third bucket will be favorable to move them for Regulating Up direction. Since in this interval we need more Regulating Down movement we will violate this condition and deploy Regulation on these Resources such that they get more charged. Similar logic can be extended for the interval if the regulation need is to Regulating up as shown in decision block 62. If in any AGC interval Total Regulation Need is greater than (>) TRF+TRS, that is the Total Regulation movement achievable from Fast Ramping Resource plus (+) the Total Regulation movement achievable from the Slow Ramping Resources. In this case all the Fast Ramping Resources will be grouped under one bucket and Regulation is deployed on all.

Figure 14:
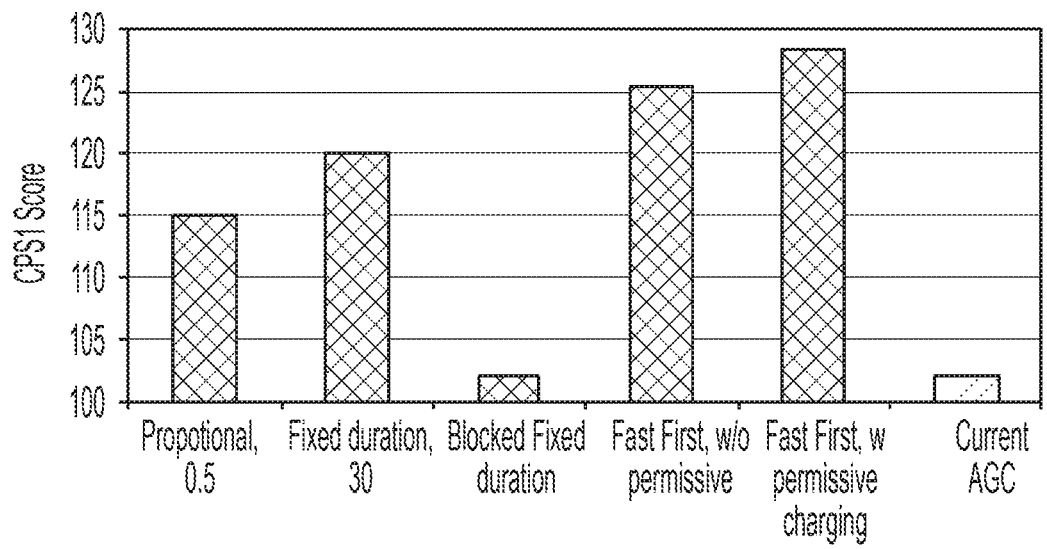
FIG. 14 is a diagram representing simulated CPS1 score comparisons with different fast signal designs.

In the study, fast AGC logic was simulated with different fast signal designs and with the same operation data. As shown in FIG. 14, Fast-First with permissive charging provides the best CPS1 score while keeping unperformed mileage due to energy limits under control.

Figure 15:
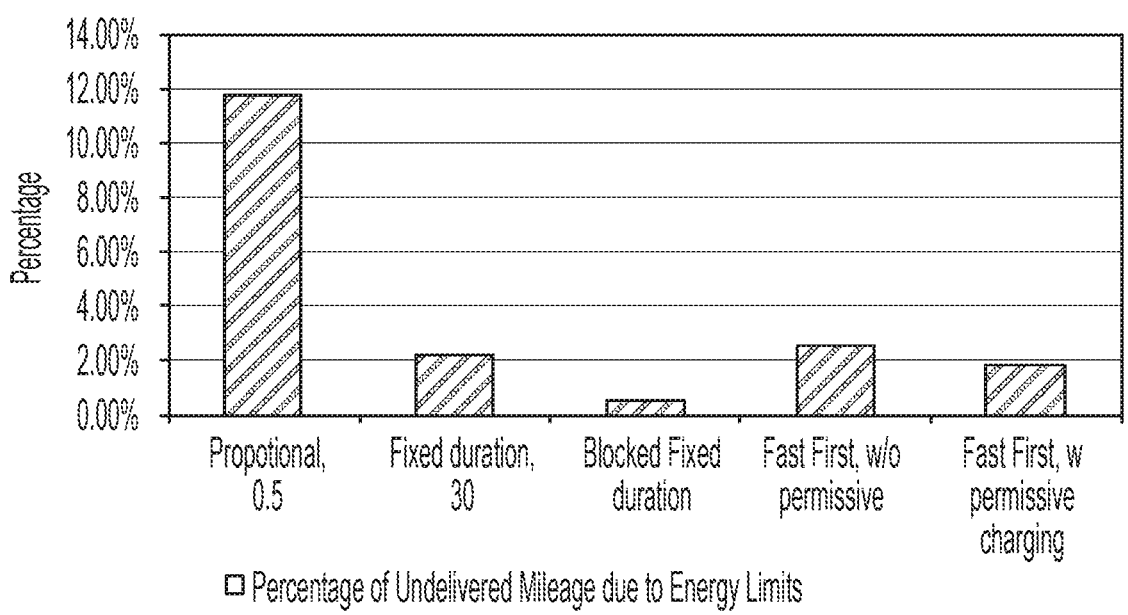
FIG. 15 is another diagram representing simulated CPS1 score comparisons with different fast signal designs.

In the simulation, it is assumed that fast-ramping resources have 200 MW output power and energy capacity is 200 MWh. In other words, fast-ramping resources have a 1-hour energy duration. When a resource's energy level reaches full or empty states, the resource is unable to respond to the AGC signal. That part of undelivered regulation mileage is calculated. FIG. 15 shows percentages of undelivered versus total regulation deployment signal mileage. Considering CPS1 scores, Fast-First with permissive charging is the best choice of design.

Fast Deployment Allocation. When total regulation deployment is split into total fast signal and total slow signal, the AGC logic needs to allocate the total signal to each individual resource. While a slow-ramping resource could continue to use the existing priority group logic, AGC needs new logic for allocating the total fast signal to individual fast-ramping resources. This study provides three options for further discussion and implementation.

Option 1. Response rate priority group based on ramp rate availability forregulation. This approach is similar to the existing priority group logic. AGC calculates a merit order based on the response rate of each resource. Larger response-rate-resources are assigned with lower numbers. Sequentially from low to high, AGC deploys fully cleared regulating reserve amounts until the total fast deployment is satisfied. This approach is easy to implement, however it still has the existing problem of un-deploying fast-ramping resources last.

Option 2. Proportionally distribute based on cleared regulating reserve amount. This approach determines individual resource regulating reserve deployment based on the ratio of its cleared regulating reserve capacity over total cleared regulating reserve capacity of all fast-ramping resources. This approach is simple to implement. However, it could cause receiving insufficient response from resources and potentially cause reliability issues. If there is a large number of resources, each one of them will receive a small deployment signal. The small signal might fall into the deadband of the resource's control region. The overall system will not receive the desired ACE correction amount.

Figure 16:
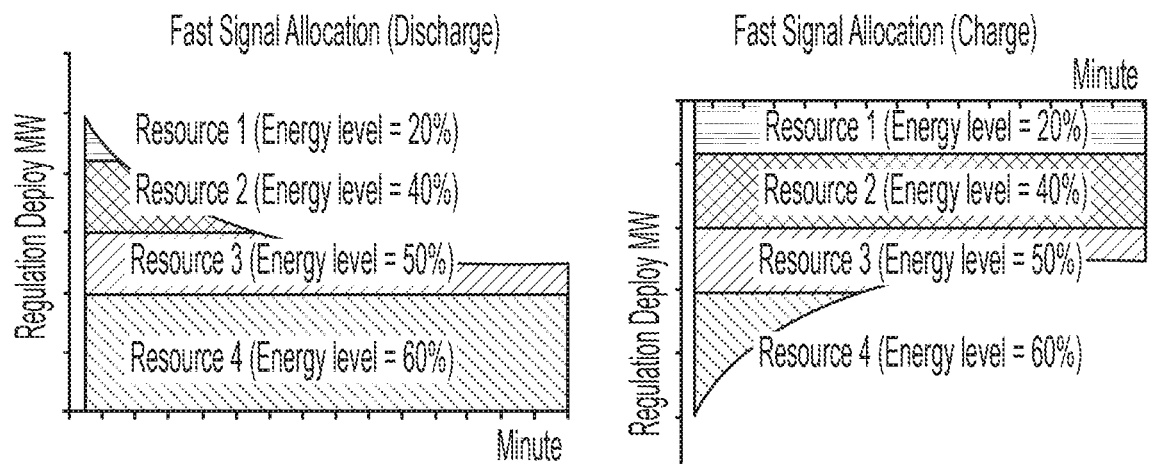
FIG. 16 is a diagram representing sample signals for allocation based on energy level deviation from neutral state.

Option 3. Energy level deviation from neutral state. This approach assumes that the preferable energy level position for energy-limit resources lies within a limited range of its total capacity, e.g., 50 percent. When the energy level deviates from this preferred position, the AGC would take opportunities to move it back to this neutral point. This requires resources to provide the controller with real-time data on the resource's energy level (e.g., state of charge for battery resources). Fast-ramping resources without energy limitation are considered as always neutral. With information on energy levels for energy-limited devices, AGC could create a dispatch order based on the degree of deviation from the neutral state. The AGC allocation logic would need to consider the current deployment direction and deploy accordingly. As shown in FIG. 16, if the total signal is discharging resources, the resource closest to full would be discharged as much as possible. Meanwhile, the resource closest to empty would be deployed as little as possible. If the total fast signal is enabling charging of the resources, the resource closest to empty should be deployed to its fullest extent. This approach could potentially help limited-energy resources continuously provide regulating reserve by reducing the chance of reaching energy limits.

Similar to the existing priority group approach, the dispatch order of deployment could be determined at five-minute intervals concurrent with the controller's real-time market processes. Alternatively, merit order could be calculated dynamically every four seconds.

Figure 17:
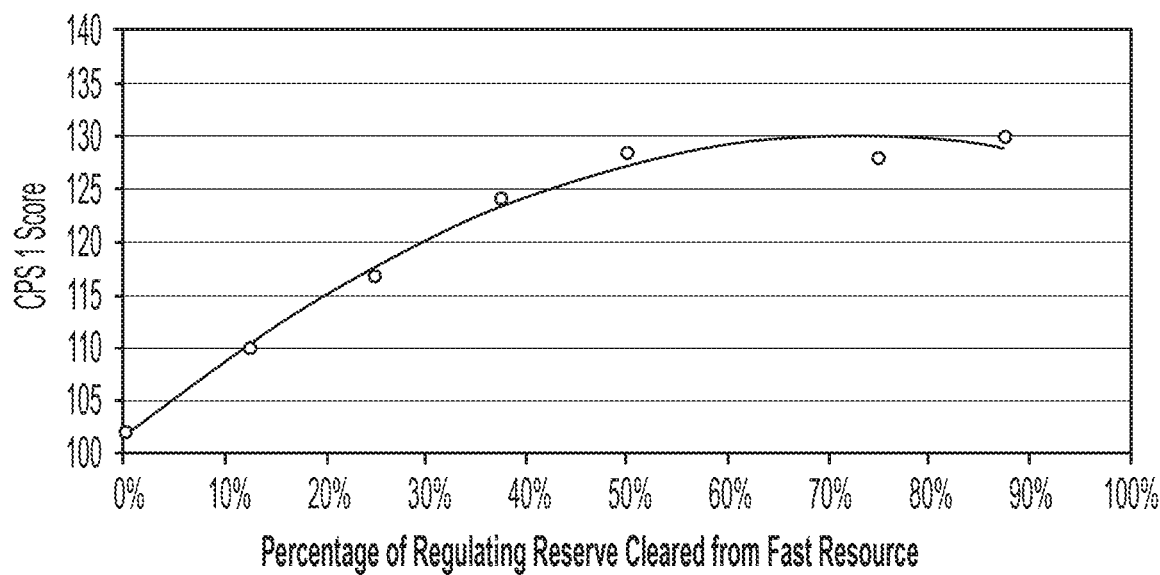
FIG. 17 is a diagram representing simulated CPS1 score under different fast-ramping resource capacities.
Figure 18:
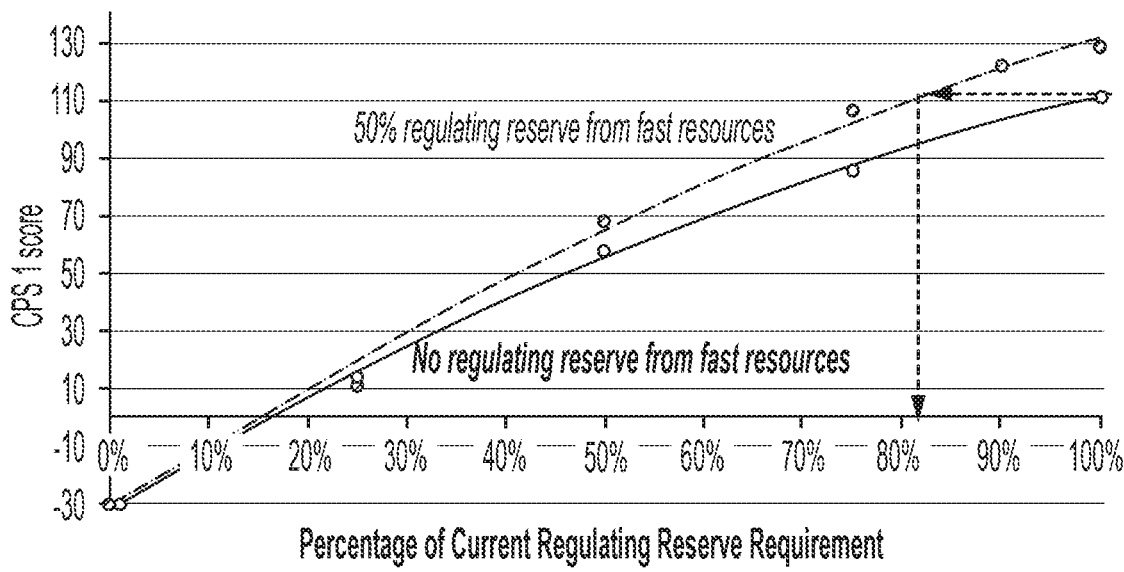
FIG. 18 is a diagram representing simulated daily CPS1 scores under different levels of regulating reserve requirements.

Benefits. AGC enhancements could attract more fast-ramping resources. Fast-ramping resources can enhance the flexibility of the system by increasing system operators' control of the system during normal and emergency conditions. Considerations and features recommended and specifically designed to accommodate energy-limited resources would allow resources to provide more continuous quality service to the controller's markets while enhancing market efficiency. FIG. 17 shows this approach works with different levels of fast-ramping resource penetration. This chart is simulated with different fast-ramping resource capacities and assumes one hour energy duration. In each scenario, regulation requirements were set same as production. As the percentage of regulation cleared from fast-ramping resources increases, CPS1 scores improved when compared to scenarios without fast-ramping resources. With large amounts of fast regulation from energy-limited resources, the risk of hitting energy limits increases. That is the reason that, after the 70 percent mark, CPS1 score improvement is less significant. However, since the controller monitors the resource's state of charge, when energy limits are constrained, UDS will adjust dispatch and clear slow resources for regulating reserve. Therefore, with slow regulation resource as backup, the risk is limited within 5-minute intervals.

Additional benefits, participation of fast-ramping resources could reduce regulation requirements. Since fast-ramping resources can respond quickly to ACE correction, simulation indicates that fast-ramping resources could improve the CPS1/BAAL score. Alternative, fast-ramping resources could potentially reduce regulation requirements while maintain the same score. Scenarios of different level regulation requirements were simulated based on the capture of controller's system conditions for the day of Aug. 11, 2015, with or without 200 MW of fast-ramping resources providing regulating reserve. As shown in FIG. 15, simulated CPS1 scores are different under each scenario. Simulation results show that the controller only needs 80 percent of the normal regulation requirement to achieve the same CPS1 score.

Additional benefits, new fast-ramping resources could provide relief for other resources from supplying regulating reserve. Regulating reserve is defined as a bidirectional product. In economic dispatch, clearing regulating reserve constrains traditional resource limits on both the minimum and maximum of their operation ranges. With additional fast-ramping resources providing regulating reserve, total production cost could be reduced by freeing up resources to provide energy or contingency reserves.

Figure 19:
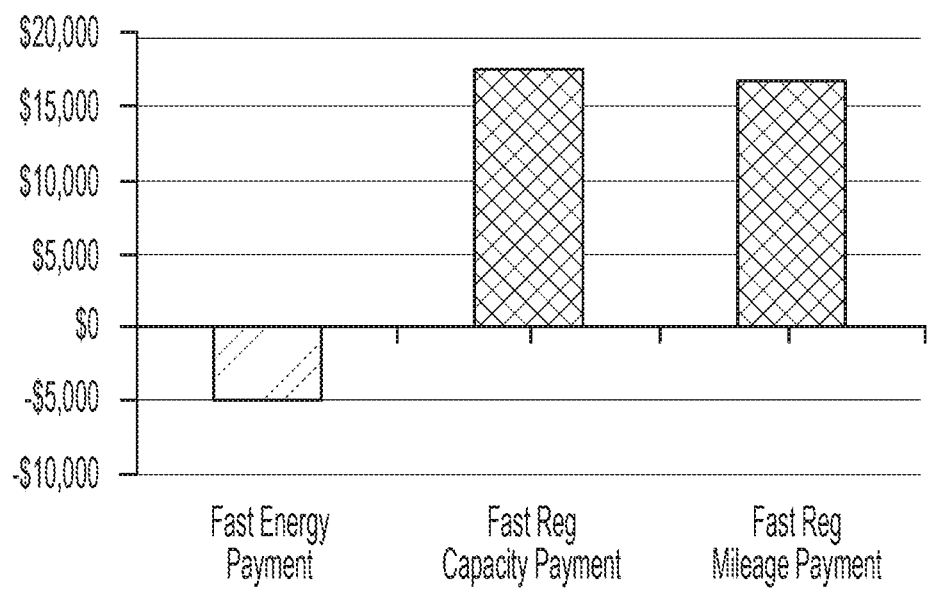
FIG. 19 is a diagram representing simulated daily revenue/charge of fast-ramping resource.

Cost—increased mileage payments that fast-ramping resources get from extra regulation mileage payments. Fast-First logic requests that fast-ramping resources promptly respond to ACE correction needs in both upward and downward directions. This approach increases the regulation mileage amount for fast-ramping resources over today's deployment. Simulation results from the recommended design show that fast-ramping resource mileage roughly doubled when compared to the current logic. Slow resource mileages showed no significant difference. FIG. 19 is calculated from simulation results for Aug. 13, 2015 system conditions, with a single fast-ramping resource of 200 MW maximum output and a 200 MWh energy capacity. It shows that energy charge is a relatively small amount compared to regulation capacity payment and regulation mileage payment.

ACRONYM GLOSSARY

AGC Automatic generation control (AGC) is a system for adjusting the power output of multiple generators at different power plants, in response to changes in the load, frequency, interchanges, etc.
ACE Area Control Error (ACE) of a Balancing Authority the magnitude and direction of which are sought to be limited by measures to comply with NERC control performance standards.
BAAL The Balancing Authority ACE Limit (BAAL)
CPS Control Performance Standard. NERC-established standards to measure Balancing Authorities' performance in maintaining energy balance and scheduled frequency.
KERMIT A Renewable Market Integration Tool developed by DNV-GL, formally KEMA, to study how integratin; large penetrations of renewable power affects sub-hourly operations
NERC The North American Electric Reliability Corporation (NERC) is a not-for-profit international regulatory authority whose mission is to assure the reliability and security of the bulk power system in North America.
SOC State of charge (SOC) is a measurement of energy amount stored in energy-limited resources.
UDS Unit dispatch system (UDS) is MISO's 5-minute real-time energy and ancillary service co-optimization clearing engine.

What is claimed is:

1. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:
  (a) providing a fast signal representing total deployment for fast resources and a slow signal representing total deployment for slow resources;
  (b) controlling the slow resources using the slow signal; and
  (c) controlling the fast ramping resources based upon the fast signal, wherein step (c) utilizes the fast signal to respond to changes in total regulation deployment, the utilization being based on $R_{fast}'(t)=[R_{total}(t)-R_{total}(t-1)]+R_{fast}(t-1)$, $R_{total}(t)$ being automatic generation control (AGC) deployed total regulating reserve for an independent system operator (ISO) at time slot t, $R_{fast}(t)$ being AGC deployed regulating reserve on fast-ramping resources at time slot t, and $R_{fast}'(t)$ being the fast signal responding to the changes in total deployment.

2. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:
(a) providing a fast signal representing total deployment for fast resources and a slow signal representing total deployment for slow resources;
(b) controlling the slow resources using the slow signal; and
(c) controlling the fast ramping resources utilizing the fast signal;
wherein steps (b) and (c) gradually replace deployment of fast-ramping resources with slow-ramping resources, the gradual replacement being based on (i) AGC deployed total regulating reserve for an ISO, (ii) AGC deployed regulating reserve on the fast-ramping resources, (iii) a fast signal response to changes in total regulation deployment, and (iv) unit dispatch system (UDS) cleared regulating reserve megawatts (MW) on slow-ramping resources, and
wherein the utilization is based on $R_{fast}'(t)=[R_{total}(t)-R_{total}(t-1)]+R_{fast}(t-1)$, $R_{total}(t)$ being the AGC deployed total regulating reserve for the ISO at time slot t, $R_{fast}(t)$ being the AGC deployed regulating reserve on the fast-ramping resources at time slot t, and $R_{fast}'(t)$ being the fast signal responding to the changes in total regulation deployment.

3. The method of claim 2, wherein the fast signal response to changes in total regulation deployment is based on:

$$R_{fast}'(t)=[R_{total}(t)-R_{total}(t=1)]+Rpast(t-1)$$

wherein the AGC deployed regulating reserve on the fast-ramping resources is based on:

$$R_{fast}(t)=R_{fast}'(t)+\varepsilon*\{sign(R_{total}(t))*\max[|-RClr_{slow}(t),0]-R_{fast}'(t)\}$$

wherein $RClr_{slow}(t)$ is UDS cleared regulating reserve MW on slow-ramping resources at time slot t, and
wherein ε is damping factor, which is a positive value and less than one.

4. The method of claim 3, wherein the slow signal is created by subtracting the fast signal from the total deployment, as such:

$$R_{slow}(t)=R_{total}(t)-R_{fast}(t)$$

wherein $R_{slow}(t)$ is AGC deployed regulating reserve on slow-ramping resources at time slot t.

5. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:
controlling dispatch of electricity on the electrical power grid including enabling fast-ramping resources;
wherein the controlling step (i) is based on AGC deployed total regulating reserve for an ISO and on AGC deployed regulating reserve on fast-ramping resources and (ii) includes utilizing fast-ramping resources to respond to total Area Control Error (ACE) correction need, and
wherein the utilization is based on $R_{fast}'(t)=[R_{total}(t)-R_{total}(t-1)]+R_{fast}(t-1)$, $R_{total}(t)$ being the AGC deployed total regulating reserve for the ISO at time slot t, $R_{fast}(t)$ being the AGC deployed regulating reserve on the fast-ramping resources at time slot t, and $R_{fast}'(t)$ being a fast signal responding to the total ACE correction need.

6. The method of claim 5, wherein the controlling step uses logic that derives total regulating reserve deployment, and also derives regulating reserve deployment for fast and slow resources from the derived total regulating reserve deployment.

7. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:
controlling dispatch of electricity on the electrical power grid including enabling fast-ramping resources;
wherein the controlling step (i) is based on AGC deployed total regulating reserve for an ISO and on AGC deployed regulating reserve on fast-ramping resources and (ii) uses fast-ramping resources to respond to changes of total deployment in real-time and then reduces the use of the fast-ramping as slower ramping resources ramp up, and
wherein utilization of a fast signal is based on $R_{fast}'(t)=[R_{total}(t)-R_{total}(t-1)]+R_{fast}(t-1)$, $R_{total}(t)$ being the AGC deployed total regulating reserve for the ISO at time slot t, $R_{fast}(t)$ being the AGC deployed regulating reserve on the fast-ramping resources at time slot t, and $R_{fast}'(t)$ being the fast signal responding to the changes of total deployment.

8. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:
controlling dispatch of electricity on the electrical power grid including enabling fast-ramping resources;
wherein the controlling step (i) is based on AGC deployed total regulating reserve for an ISO and on AGC deployed regulating reserve on fast-ramping resources and (ii) uses fast-ramping resources to respond to changes of total deployment in real-time and then adjusts the use of the fast-ramping resources to control energy levels to satisfy a neutrality criterion, and
wherein utilization of a fast signal is based on $R_{fast}'(t)=[R_{total}(t)-R_{total}(t-1)]+R_{fast}(t-1)$, $R_{total}(t)$ being the AGC deployed total regulating reserve for the ISO at time slot t, $R_{fast}(t)$ being the AGC deployed regulating reserve on the fast-ramping resources at time slot t, and $R_{fast}'(t)$ being the fast signal responding to the changes of total deployment.

9. The method of claim 8, wherein the controlling step moves limited-duration resources back to neutral by permissively charging based on a state of change.

10. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:

controlling dispatch of electricity on the electrical power grid including enabling fast-ramping resources;

wherein the controlling step (i) is based on AGC deployed total regulating reserve for an ISO and on AGC deployed regulating reserve on fast-ramping resources, (ii) utilizes fast-ramping resources to respond to changes of total ACE correction need, and (iii) gradually replaces deployment of fast-ramping resources with deployment of slow-ramping resources over time, and wherein utilization of a fast signal is based on $R_{fast}'(t) = [R_{total}(t) - R_{total}(t-1)] + R_{fast}(t-1)$, $R_{total}(t)$ being the AGC deployed total regulating reserve for the ISO at time slot t, $R_{fast}(t)$ being the AGC deployed regulating reserve on the fast-ramping resources at time slot t, and $R_{fast}'(t)$ being the fast signal responding to the changes of the total ACE correction need.

11. A method for operating an electrical power grid system that includes an electrical power grid, a plurality of power generation participants providing electrical power to the electrical power grid, and a plurality of consumers drawing electrical power from the electrical power grid, where at least a portion of the power generation participants include fast-ramping power generation resources and at least a portion of the power generation participants include slow-ramping power generation resources, the method comprising:

controlling dispatch of electricity on the electrical power grid including enabling fast-ramping resources;

wherein the controlling step (i) is based on AGC deployed total regulating reserve for an ISO and on AGC deployed regulating reserve on fast-ramping resources, (ii) monitors resource energy levels state of change, and (iii) assists resource state of change (SOC) back to neutral based on the monitoring, and wherein utilization of a fast signal is based on $R_{fast}'(t) = [R_{total}(t) - R_{total}(t-1)] + R_{fast}(t-1)$, $R_{total}(t)$ being the AGC deployed total regulating reserve for the ISO at time slot t, $R_{fast}(t)$ being the AGC deployed regulating reserve on the fast-ramping resources at time slot t, and $R_{fast}'(t)$ being the fast signal responding to changes in total regulation deployment.

* * * * *